United States Patent Office 2,911,412
Patented Nov. 3, 1959

2,911,412

PRODUCTION OF ALPHA, ALPHA-SPIRO-HEPTA-METHYLENE-SUCCINIC ACID IMIDES

Guenter Scheuerer and Otto Schlichting, Ludwigshafen (Rhine), Germany, assignors to Badische Anilin- & Soda-Fabrik Aktiengesellschaft, Ludwigshafen (Rhine), Germany No Drawing. Application November 6, 1957
Serial No. 694,711

Claims priority, application Germany November 10, 1956

6 Claims. (Cl. 260—326.5)

This invention relates to new derivatives of cyclo-octane and their production.

The object of the invention is the production of alpha, alpha-spiro-heptamethylenesuccinic acid imides.

A further object of the invention is to provide new substances with valuable pharmacological properties.

The objects of the invention are achieved by allowing alkali cyanide to act on a cyclo-octylidene-cyanoacetic acid ester (I), heating the resultant alpha, alpha-heptamethylenesuccinic acid dinitrile-beta-carboxylic acid ester (II) with a strong inorganic acid, and subjecting the alpha, alpha-heptamethylenesuccinic acid (III) thereby formed by saponification and decarboxylation, after conversion into its anhydride (IV) to treatment with ammonia, urea or a primary amine to convert it into its imide.

In the said manner there are obtained compounds of the general formula:

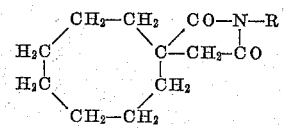

in which R can have the significance given further below.

The sequence of reaction according to this invention can be formulated as follows in the case of the use of cyclo-octylidene-cyanoacetic acid ethyl ester, potassium cyanide and methylamine as initial materials:

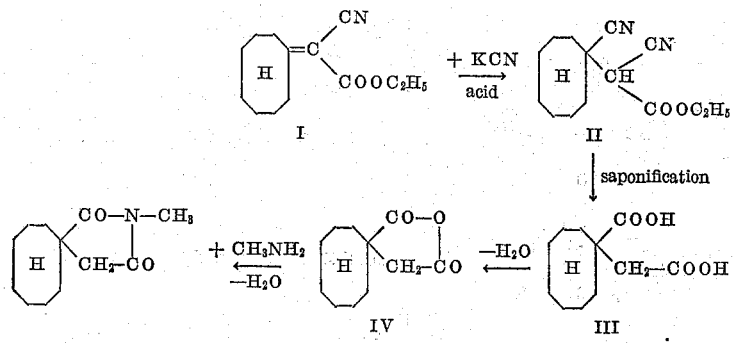

The cyclo-octylidene-cyanoacetic acid esters serving as initial materials are readily obtainable by condensation of cyclo-octanone with cyanoacetic acid esters. They may be obtained for example according to the directions of the German patent specification No. 925,168 (U.S. patent specification No. 2,744,900 and British patent specification No. 756,471).

According to these directions, starting from cyclo-octanone, it is heated in glacial acetic acid solution with a cyanoacetic acid ester, preferably in the presence of acetamide, formamide, piperidine or sodium acetate. After distilling off the glacial acetic acid together with the water of reaction formed, the desired initial material is obtained. In the said literature it is designated as Δ1.2-cyclo-octenyl-cyanoacetic acid ester. This compound, in which the double linkage is situated in the ring, behaves in the reaction according to the present invention as if the double linkage were situated outside the ring (see Formula I).

The kind of alcohol radical in the cyclo-octylidene-cyanoacetic acid ester (I) used as initial material is without importance for the reaction according to this invention. The ester can be formed for example from a low molecular aliphatic alcohol, such as methyl, ethyl, propyl, isopropyl, butyl and isobutyl.

As the alkali cyanide there are chosen for practical reasons the readily accessible sodium or potassium salts of hydrocyanic acid.

As the strong inorganic acid with which the alpha, alpha-heptamethylene-succinodinitrile-beta-carboxylic acid ester (II) first formed is heated, there is preferably used sulfuric acid because the most favorable yields are achieved therewith. 50 to 70% sulfuric acid in general gives the best yields. For the expert no further instructions are necessary as to what acids and what acid concentrations are to be used moreover for the saponification of the alpha, alpha-heptamethylenesuccinodinitrile-beta-carboxylic acid ester.

In the formula given above the radical R is hydrogen if the anhydride (IV) is reacted with ammonia or urea. For the reaction of the anhydride (IV) there may also be used primary amines. Suitable amines are for example low molecular aliphatic amines with 1 to 8 carbon atoms. The carbon radical can contain double linkages or triple linkages. They can be branched or straight. There may be mentioned for example methylamine, ethylamine, propylamine, butylamine, allylamine. The carbon radical can also in turn contain other radicals, as for example hydroxyl groups. Thus ethanolamine is also suitable as a primary amine. The carbon radical can also be cycloaliphatic, as is the case for example in cyclohexylamine. Aromatic primary amines, if desired with further substituents on the aromatic ring can also be used, for example halogen-anilines, ethoxy-anilines and nitro-anilines. The primary amines can also bear heterocyclic radicals, so that aminopyridines are also suitable. The primary amines enumerated are merely some of the possibilities. Many other primary amines can also be used in the process of this invention. The radical which is situated on the nitrogen atom of the amino group corresponds to the radical R in the above mentioned general formula.

Allowing the alkali cyanide to act on the cyclo-octylidene-cyanoacetic acid ester (I) is possible for example by allowing cyclo-octylidene-cyanoacetic acid ester (I) in aqueous-alcoholic solution to stand together with alkali cyanide for several hours at room temperature. The reaction of the alkali cyanide with the cyclo-octylidene-cyanoacetic acid ester proceeds more rapidly when the aqueous-alcoholic solution is heated. It is preferable to use an excess amount of alkali cyanide, for example 1.5 to 2.5 mols, with reference to cyclo-octylidene-cyanoacetic acid ester (I). The expert will have no difficulty in recognising the end of the reaction. Depending on the temperature at which the alkali cyanide acts on the cyclo-octylidene-cyanoacetic acid ester (I) the reaction ends earlier or later. For example it lasts 48 hours at 15° to 25° C., 12 hours at 30° to 40° C., 5 hours at 50° to 60° C., 15 minutes at 75° to 80° C. Instead of a mixture of water with ethyl alcohol, there can also be used mixtures of water with other water soluble organic solvents, for example methanol, acetone, dioxane or tetrahydrofurane.

From alkali cyanide and cyclo-octylidene-cyanoacetic acid ester (I) in the said manner there is first formed the alkali compound of the alpha, alpha-heptamethylenesuccino-dinitrile-beta-carboxylic acid ester (II). The free ester can be recovered from this alkali metal compound by acidification.

The alpha, alpha-heptamethylenesuccinodinitrile-beta-carboxylic acid ester (II) or its alkali derivative is then heated under reflux in the presence of acid. Carbon dioxide is split off by the heating. When the splitting off of carbon dioxide ceases, the alpha, alpha-heptamethylene-succinic acid (III) has been formed from (II) by saponification and decarboxylation. The expert will have no difficulty in finding a suitable concentration of, for example, sulfuric acid, a suitable heating temperature and a suitable duration of heating in order to obtain the best possible yields in the conversion of compound II into compound III. For example the saponification and decarboxylation of the dinitrile when using 62% sulfuric acid and heating to an internal temperature of 140° C., are ended after about 8 hours. Other concentrations and temperatures may also be used, for example 110° C. with 50% sulfuric acid, 120° C. with 55% sulfuric acid, 130° to 145° C. with 60 to 70% sulfuric acid. Highly concentrated sulfuric acid is not recommended because it is well known that this can destroy organic substances especially at high temperatures. For the success of the saponification of the dinitrile and the decarboxylation it is immaterial what amounts of acid are used. In general however we use an amount by weight of the mixture of sulfuric acid and water which is four to five times that of the substance (II) to be saponified. The time which is necessary for conversion of the compound II into the compound III amounts to about 8 to 9 hours but depends in detail on the temperature and the concentration of the sulfuric acid.

There are other possibilities of converting the compound II by saponification and decarboxylation into the compound III, for example according to the Journal of Organic Chemistry, volume 15 (1950), page 381: by heating for several hours under reflux with sulfuric acid in glacial acetic acid at about 120° C. and then heating for several hours with about 20% caustic potash solution at about 100° C.

The alpha, alpha-heptamethylene-succinic acid is then preferably isolated in the way familiar to any expert and converted into the anhydride (IV). The anhydride can be obtained for example by heating the acid and, if desired, reduced pressure may be used. There may additionally or solely also be used agents for splitting off water, as for example acetyl chloride, acetic anhydride or phosphorus oxychloride, in order to convert the acid (III) into the anhydride (IV). For the production of the anhydride also, the expert needs no detailed instructions in each case because he will be quite familiar with the measures necessary for the purpose.

By reacting the anhydride (IV) in the cold with ammonia or a primary amine, there is in general first obtained an amide acid. This changes into the imide by heating, for example to 150° to 200° C. at reduced pressure, or by heating with agents which split off water, such as acetyl chloride or acetic anhydride. The imide can however be obtained directly from the anhydride by melting for example alpha, alpha-spiro-heptamethylene-succinic acid anhydride (IV) with urea at elevated temperatures. Temperatures between 130° and 160° C. are suitable for example.

The new compounds obtainable according to this invention are some of them crystalline and some are liquid. They have good anti-epileptic, and antispasmodic (i.e.

| | Toxicity mice p.o., mg./kg. | Protective dosage against cardiazol cramp, mg./kg. | Protective dosage against electrocramp, mg./kg. |
|---|---|---|---|
| 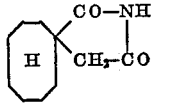 | about 1,400 | about 150 | about 100. |
| 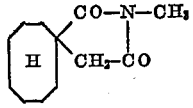 | more than 2,000 | about 400 | more than 400. |
| 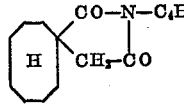 | more than 2,000 | more than 400 | about 150. |
| 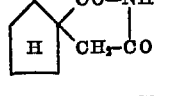 | about 1,400 | more than 400 | more than 400. |
| 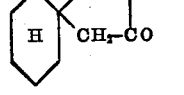 | about 150 | more than 100 | more than 100. |
| 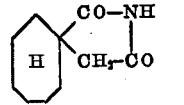 | about 1,000 | about 400 | about 150. | cramp-releasing and cramp-preventing) action with only slight toxicity.

The following table shows that the new succinic acid imides containing a cyclo-octane ring in spirane-like combination have considerably less toxicity than the corresponding derivatives of cyclopentane, cyclohexane and cycloheptane. In spite of their smaller toxicity, the new compounds have at least equally good antispasmodic action as the known compounds.

As regards the values given in the table, the following remarks apply:

The protective dosage against electrocramp is determined according to the method: Maximal electroshock assay, Toman, Swinyard and Goodman, Journal of Neurophysiology, 9, 231 (1946).

The protective dosage against cardiazol cramp is determined according to the method: anti-metrazol assay, Everett and Richards, Journal of Pharmacology and Experimental Therapeutics, 81, 402 (1944).

The following examples will further illustrate this invention but the invention is not restricted to these examples or the special measures described therein. The parts specified in the examples are parts by weight.

*Example 1*

A solution of 130 parts of potassium cyanide in 260 parts of water is added to a solution of 220 parts of cyclo-octylidene-cyanoacetic acid ethyl ester in 880 parts of ethyl alcohol and the mixture allowed to stand for 48 hours at 20° to 25° C. After distilling off the alcohol in vacuo, adding water and acidifying with dilute hydrochloric acid, the oil which separates is taken up in benzene and after distilling off the same there are obtained 245 parts of crude alpha, alpha-heptamethylene-succino-dinitrile-beta-carboxylic acid ethyl ester.

This product is heated for 8 hours with an about 62% sulphuric acid (prepared from 965 parts of concentrated sulphuric acid and 530 parts of water) under reflux at an internal temperature of about 140° C. After cooling, it is poured onto ice and the precipitated crude acid is filtered off by suction. By dissolving it in hot sodium carbonate solution, filtering and precipitating with about 17% hydrochloric acid, 190 parts of alpha, alpha-heptamethylene-succinic acid of the melting point 155° to 156° C. are obtained. Recrystallised from 10% acetic acid, it melts at 157° C.

380 parts of acetyl chloride are added to the alpha, alpha-heptamethylene-succinic acid and the whole heated for 45 minutes under reflux. After distilling off the excess acetyl chloride, 157 parts of alpha, alpha-spiro-heptamethylene-succinic acid anhydride are obtained which boils at 130° to 132° C. at 0.3 Torr pressure.

38 parts of the anhydride thus obtained are mixed with 13 parts of urea and heated to 160° C. After the reaction has died away, the whole is kept at the said temperature for another half an hour and the melt then poured into cold water. The deposited precipitate is filtered off by suction, dried and recrystallised from xylene. 34 parts of alpha, alpha-spiro-heptamethylene-succinimide of the melting point 142° to 143° C. are obtained. Its formula is:

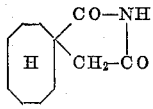

Instead of the 220 parts of cyclo-octylidene-cyanoacetic acid ethyl ester specified in paragraph 1 of this example, 235 parts of the propyl ester or 249 parts of the butyl ester may be used with the same result.

*Example 2*

220 parts of cyclo-octylidene-cyanoacetic acid methyl ester are dissolved in 320 parts of methanol. A solution of 130 parts of potassium cyanide in 400 parts of water is added and the mixture heated under reflux to boiling for 15 minutes. Then the further procedure of Example 1 is followed up to the recovery of the alpha, alpha-spiro-heptamethylene-succinic acid anhydride.

50 parts of this anhydride are dissolved in 87 parts of dry benzene, 23 parts of normal-butylamine are added and the whole heated to boiling unde reflux for 1 hour. By distilling off the benzene at reduced pressure there are obtained 52 parts of the half-normal-butylimide of alpha, alpha-heptamethylene-succinic acid which after recrystallisation from dilute alcohol melts at 125° to 126° C.

By heating for 2 hours with 104 parts of acetyl chloride under reflux and subsequently distilling off the excess acetyl chloride, there are obtained therefrom 39 parts of alpha, alpha-spiro-heptamethylene-succinic acid N-normal-butylimide which boils at 124° to 128° C. under 0.2 Torr pressure.

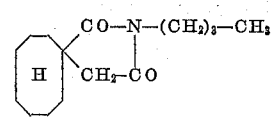

In a corresponding way from 38 parts of alpha, alpha-spiro-heptamethylene-succinic acid anhydride by reaction with 38 parts of meta-chloraniline in 165 parts of benzene, there are obtained 60 parts of the half-meta-chloranilide of alpha, alpha-heptamethylene-succinic acid of the melting point 167° to 168° C. and therefrom 46 parts of alpha, alpha-spiro-heptamethylene-succinic acid N-meta-chlorphenylimide of the melting point 116° C. (from cyclohexane).

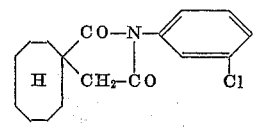

*Example 3*

39 parts of alpha, alpha-spiro-heptamethylene-succinic acid anhydride prepared as in the foregoing examples are heated in 150 parts of dry benzene with 20 parts of 2-aminopyridine for 1 hour to boiling under reflux. Upon cooling, 50 parts of the half-(pyridyl-(2)-) amide of alpha, alpha-heptamethylene-succinic acid crystallise out; its melting point after recrystallisation from normal-butanol is 158° C.

This product is heated to 160° to 170° C. under reduced pressure until, after about 2 hours, no further water is split off. The melt, which solidifies after cooling, is recrystallised from cyclohexane. 40 parts of alpha, alpha-spiro-heptamethylene-succinic acid N-(2-pyridyl)-imide of the melting point 105° to 106° C. are obtained. The hydrochloride prepared therefrom in the usual way melts at 155° to 156° C.

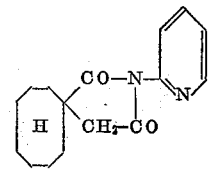

By reaction of 40 parts of the anhyride with 32 parts of para-ethoxyaniline there are obtained as end product in an analogous way 55 parts of alpha, alpha-spiro-heptamethylene-succinic acid N-(para-ethoxyphenyl)-imide of the melting point 105° to 107° C.:

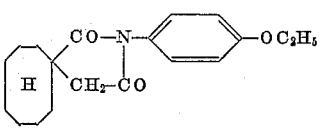

By reacting 58 parts of the anhydride with 21 parts of ethanolamine there can be obtained by the same method of operation, 57 parts of the corresponding N-(beta-hydroxyethyl)-imide of the melting point 47° to 48° C.

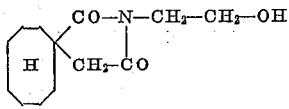

By reaction of 40 parts of the anhydride with 20 parts of allylamine there are obtained in an analogous way 35 parts of alpha, alpha-spiro-heptamethylene-succinic acid N-allylimide of the boiling point 136° C. under 0.3 Torr:

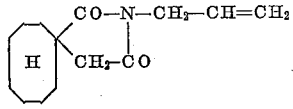

*Example 4*

Gaseous methylamine is led while cooling into a solution of 40 parts of alpha, alpha-spiro-heptamethylene-succinic acid anhydride prepared as in Example 1 in 525 parts of absolute ether until saturation is reached. The whole is then evaporated to dryness, the residue dissolved in dilute sodium carbonate solution and the half-methylamide of alpha, alpha-heptamethylene-succinic acid formed precipitated with dilute hydrochloric acid. It melts at 144° to 145° C.

38 parts of this half-methylamide are heated to boiling with 76 parts of acetyl chloride for 2 hours under reflux. After evaporating the acetyl chloride there remain behind 30 parts of alpha, alpha-spiro-heptamethylene-succinic acid N-methylimide of the boiling point 134° C. under 0.5 Torr:

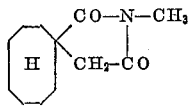

In an analogous way, by leading gaseous ammonia into the ethereal solution of 38 parts of the anhydride there are obtained 35 parts of the half-amide of alpha, alpha-hepta-methylene-succinic acid of the melting point 182° C. (from acetonitrile) and therefrom 26 parts of the alpha, alpha-spiro-heptamethylene-succinimide of the melting point 142° to 143° C. already described in Example 1.

What we claim is:

1. A compound of the general formula

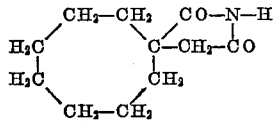

2. A compound of the general formula

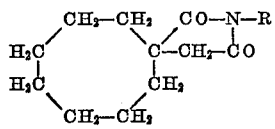

wherein R is the hydroxy ethyl radical.

3. A compound of the general formula

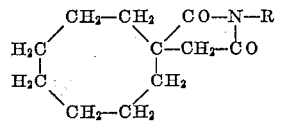

wherein R stands for para-ethoxy phenyl.

4. A compound of the general formula

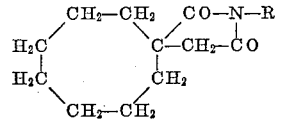

wherein R stands for a meta chloro phenyl.

5. The compound of the formula

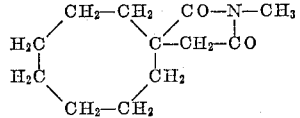

6. A compound of the general formula

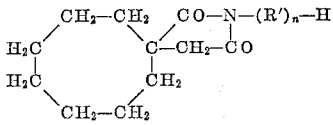

wherein $n$ stands for one of the figures 0 and 1 and R' is a member selected from the group consisting of the divalent radical —$CH_2$—, —$CH_2$—$CH_2$—

—$CH_2$—$CH_2$—O—, —$CH_2$—$CH$=$CH$—
—$CH_2$—$CH_2$—$CH_2$, —$CH_2$—$CH_2$—$CH_2$—$CH_2$—

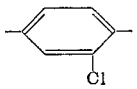

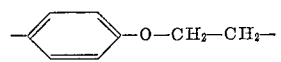

and

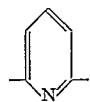

References Cited in the file of this patent

UNITED STATES PATENTS

| | | |
|---|---|---|
| 2,862,026 | Buchner et al. | Nov. 25, 1958 |
| 2,864,825 | Heinzelman et al. | Dec. 16, 1958 |

OTHER REFERENCES

Miller et al.: J. Amer. Chem. Soc., vol. 73, pp. 4895–4898 (1951).

Cragoe et al.: J. Org. Chem., vol. 15 (1950), p. 381.

Desai et al.: Chemical Abstracts, vol. 35 (1941), p. 6934.